(12) United States Patent
Allen et al.

(10) Patent No.: US 11,514,235 B2
(45) Date of Patent: *Nov. 29, 2022

(54) INFORMATION EXTRACTION FROM OPEN-ENDED SCHEMA-LESS TABLES

(71) Applicant: INTERNATIONAL BUSINESS MACHINES CORPORATION, Armonk, NY (US)

(72) Inventors: Joshua Allen, Durham, NC (US); Andrew R. Freed, Cary, NC (US); Thai T. La, Raleigh, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 8 days.

This patent is subject to a terminal disclaimer.

(21) Appl. No.: 16/898,996

(22) Filed: Jun. 11, 2020

(65) Prior Publication Data
US 2020/0302114 A1 Sep. 24, 2020

Related U.S. Application Data

(63) Continuation of application No. 16/145,676, filed on Sep. 28, 2018, now Pat. No. 10,740,545.

(51) Int. Cl.
*G06F 40/169* (2020.01)
*G06F 16/31* (2019.01)
(Continued)

(52) U.S. Cl.
CPC .......... *G06F 40/169* (2020.01); *G06F 16/316* (2019.01); *G06F 16/3334* (2019.01);
(Continued)

(58) Field of Classification Search
CPC .... G06F 40/169; G06F 16/316; G06F 16/334; G06F 16/35; G06F 40/216; G06F 40/15; G06K 9/00442
See application file for complete search history.

(56) References Cited

U.S. PATENT DOCUMENTS 8,977,953 B1 * 3/2015 Pierre ................... G06F 40/289
715/201
2004/0111272 A1 * 6/2004 Gao ........................ G06F 40/58
704/277

(Continued)

OTHER PUBLICATIONS

Wei, Table extraction for answer retrieval, Springer Science+ Business Media, 2006, whole document (Year: 2006).*

(Continued)

*Primary Examiner* — Sonia L Gay
(74) *Attorney, Agent, or Firm* — Tutunjian & Bitetto, P.C.; Alexander Jochym

(57) ABSTRACT

Systems and methods for generating and annotating cell documents include extracting tables from a document using a table extraction engine. Headers are extracted for each of the tables using a header detection engine. Cells are extracted from each of the tables using a cell extraction engine. A cell document is generated for each of the cells which are each correlated to corresponding portions of the headers, each cell document recording the correlation between the cells and the headers. Each cell document is annotated to generate annotated cell documents with a cell recognition model trained to perform natural language processing on the cell documents by classifying each term in each of the cell documents and extracting relationships between the terms of each of the cell documents.

18 Claims, 10 Drawing Sheets

(51) Int. Cl.
*G06F 16/33* (2019.01)
*G06F 16/35* (2019.01)
*G06F 40/216* (2020.01)
*G06F 40/18* (2020.01)
*G06V 30/40* (2022.01)

(52) U.S. Cl.
CPC .............. *G06F 16/35* (2019.01); *G06F 40/18* (2020.01); *G06F 40/216* (2020.01); *G06V 30/40* (2022.01)

(56) References Cited

U.S. PATENT DOCUMENTS

| 2015/0026556 A1 | 1/2015 | Stadermann et al. |
| 2016/0078102 A1* | 3/2016 | Crouch ................. G06F 16/313 707/722 |
| 2016/0104077 A1 | 4/2016 | Jackson, Jr. et al. |

OTHER PUBLICATIONS

Milosevic, "Table Mining and Data Curation From Biomedical Literature", End of Year Report submitted to the University of Manchester in the Faculty of Engineering and Physical Sciences, 2014, 113 pages.

List of IBM Patents or Patent Applications Treated as Related dated Jun. 11, 2020, 2 pages.

Mell et al. "The NIST Definition of Cloud Computing", NIST Special Publication 800-145, 2011, 7 pages.

* cited by examiner

INFORMATION EXTRACTION FROM OPEN-ENDED SCHEMA-LESS TABLES

BACKGROUND

Technical Field

The present invention generally relates to information extraction from document tables, and more particularly to information extraction from open-ended schema-less tables.

Description of the Related Art

Much of the electronic information in the world is contained within unstructured text, such as, word processing documents, hyper-text documents, presentation slides, scanned images or texts, among other formats. Many of the documents format some information in tables. Indeed, tables are the best format for conveying some types of information, such as, e.g., statistical data. However, the tables used in unstructured documents may not be easily extractable, due to, e.g., being open-ended, schema-less, unstructured, or for other reasons. Thus, identifying, extracting and searching the information in the tables of unstructured documents is difficult without human input because there is insufficient understanding of the layout of the table and of relationships between cells in the table. In fact, even some structured tables can be similarly difficult to analyze.

For example, searching for information contained within a table can fail because the table may be a flat image without machine readable characters, or the query of the search may have language that does not match the cell contents. Indeed, the cell contents may not even be defined in relation to any type of data for what the contents represent. Thus, searching the cells is impracticable.

SUMMARY

In accordance with an embodiment of the present invention, a method for annotating cells of a table for natural language processing. The method includes extracting one or more tables from a document using a table extraction engine. Headers are extracted for each of the one or more tables using a header detection engine by accessing the one or more tables via a memory and returning the tables with the headers to the memory. Cells are extracted from each of the one or more tables using a cell extraction engine by accessing the one or more tables and the headers via the memory and returning the tables with the headers and the cells to the memory. A cell document is generated for each of the cells and correlating each of the cells to corresponding portions of the headers, each cell document recording the correlation between one of the cells and the corresponding portions of the headers. Each cell document is annotated to generate annotated cell documents with a cell recognition model trained to perform natural language processing on the cell documents by classifying each term in each of the cell documents and extracting relationships between the terms of each of the cell documents.

In accordance with another embodiment of the present invention, a method for annotating cells of a table for natural language processing. The method includes extracting one or more tables from a document using a table extraction engine. Headers are extracted for each of the one or more tables using a header detection engine by accessing the one or more tables via a memory and returning the tables with the headers to the memory. Cells are extracted from each of the one or more tables using a cell extraction engine by accessing the one or more tables and the headers via the memory and returning the tables with the headers and the cells to the memory. A cell document is generated for each of the cells and correlating each of the cells to corresponding portions of the headers, each cell document recording the correlation between one of the cells and the corresponding portions of the headers. Each cell document is annotated with a cell recognition model trained to perform natural language processing on the cell documents, the annotating including classifying each term in each of the cell documents with a term classifier and extracting relationships between the terms of each of the cell documents using an extractor configured to perform statistical modelling that takes into account linguistic feature statistics in a domain corresponding to the document. Annotations are generated to represent the relationships, and the annotations are inserted into corresponding ones of the cell documents to form annotated cell documents. The annotated cell documents are stored in a searchable database In accordance with another embodiment of the present invention, a system for annotating cells of a table for natural language processing. The system includes a cell document generator that generates cell documents for each cell of each table in a document, the cell document generator including, a table extraction engine that extractions one or more tables from a document, a header detection engine that extracts headers for each of the one or more tables by accessing the one or more tables via a memory and returning the tables with the headers to the memory and a cell extraction engine that extracts cells from each of the one or more tables and generating a cell document for each of the cells and correlating each of the cells to corresponding portions of the headers, each cell document recording the correlation between one of the cells and the corresponding portions of the headers. A cell document interpreter annotates each cell document to generate annotated cell documents with a cell recognition model trained to perform natural language processing on the cell documents by classifying each term in each of the cell documents and extracting relationships between the terms of each of the cell documents.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Embodiments of the present invention facilitate identification, extraction and search of information included within tables of electronic documents.

Aspects of the present invention include one or more documents formatted in, e.g., hyper-text mark-up language (HTML). The documents can include a combination of text as well as tables. To better search the tables of the documents, a cell document generator recognizes and analyzes each table in each document.

The cell document generator can include, e.g., a table extraction engine, a header detection engine, and a cell extraction engine, among other components. The table extraction engine analyzes the HTML documents to find and extract the tables. The tables can be a flat image of a table, in which case, the table extraction engine includes an optical character recognition (OCR) module to convert the flat image into a text based image. However, in many cases, the table will include text for header and cell contents, in which case the OCR module is not used.

Tables extracted from the documents by the table extraction engine are then analyzed by a header detection engine that identifies the headers and the contents of the headers. The headers of the tables are reformatted by the header detection engine to generate tables with recognized and classified headers. A cell extraction engine can then perform a similar analysis on each of the cells of the tables to detect and classify contents of the cells according to the headers under which the cells fall. The cell extraction engine can use the cell classifications to create a cell document for each cell in each table that defines the cell contents as well as the relationship of the cell to the headers. Accordingly, the cell documents include metadata created by the cell document generator such that each cell can be searched with relationships between cells and headers conveyed in a concise and easily interpretable manner.

According to aspects of the present invention, the cell documents can be interpreted for better searching. Because the tables include information regarding a topic, the topic can be discovered and a cell interpreter can utilize a language recognition model to recognize the domain of the data contained within the cells. Thus, a natural language search can be performed, and the model can interpret the cell contents to match the natural language query. Thus, more accurate and efficient searching of the tables can be performed.

Exemplary applications/uses to which the present invention can be applied include, but are not limited to: search engines, conversion of document images to webpages, electronic books and textbooks, online versions of technical documents, and other formats where interaction with a table is desired.

Figure 1:
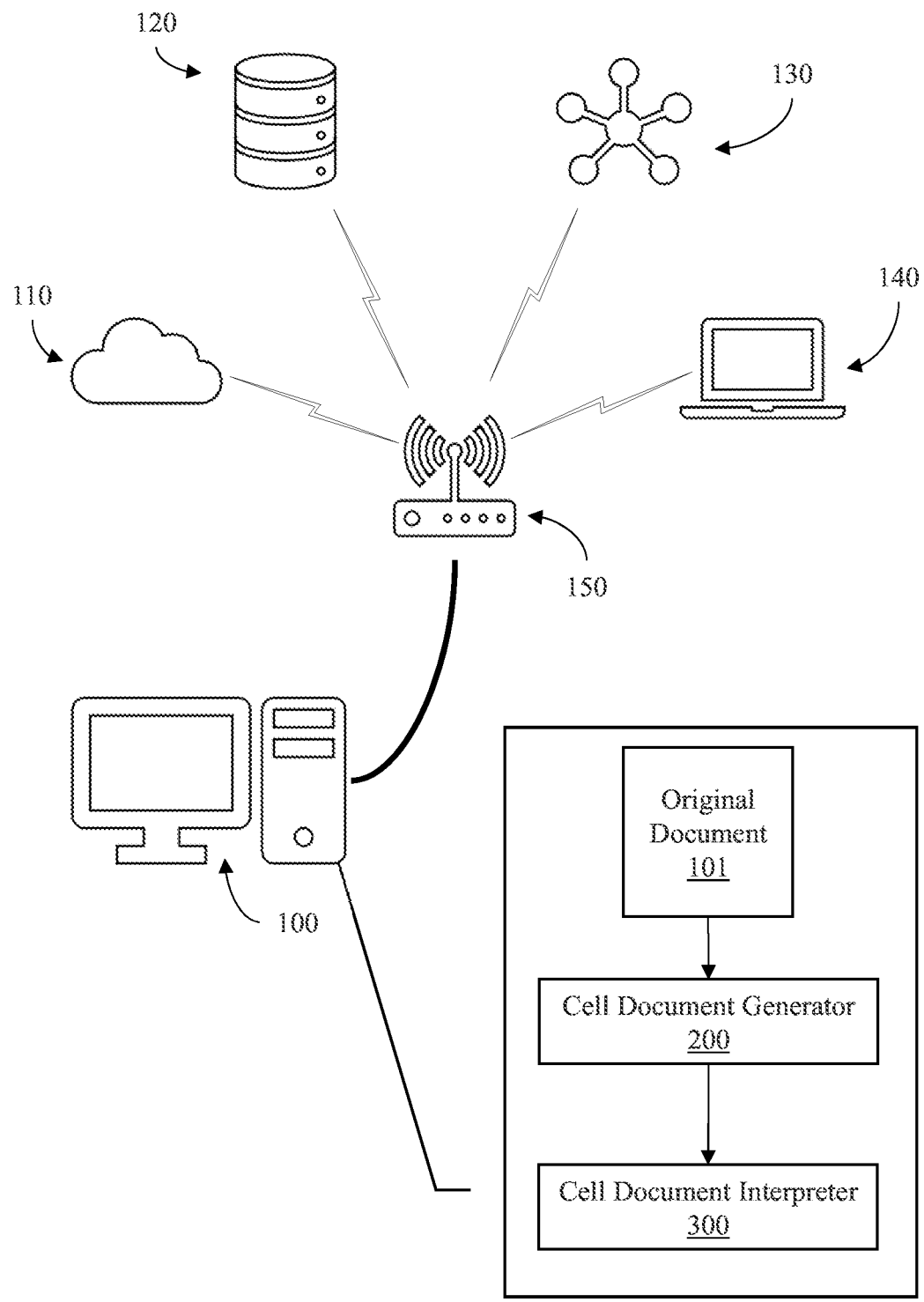
FIG. 1 is a diagram showing a system for extracting information from tables in a document, in accordance with an embodiment of the present invention.

Referring now to the drawings in which like numerals represent the same or similar elements and initially to FIG. 1, a system for extracting information from tables in a document is shown in accordance with one embodiment.

According to aspects of the present invention, users can interact with an original document 101 via a computer 100. However, the original document 101 may contain tables that are presented as an open-ended and schema-less table. Therefore, to generate a schema for the tables, the original document 101 is provided to a cell document generator 200. The cell document generator 200 analyzes the original document 101 to extract and analyze each table within the original document 101. The original document 101 can include any document format, such as, e.g., HTML, portable document format (PDF), Microsoft Office™ documents, extensible mark-up language (XML), plain text, or any other document format. Thus, the tables in the original document 101 may not have a schema and can be open-ended. Thus, the contents of cells of the tables are not accessible to discovery and analysis in the context of the table. Alternatively, the tables may be presented with a schema, however the schema may be insufficient or incompatible with certain interactions such as, e.g., natural language searches, meta-data analysis, data compilation and/or analysis of cell contents, among other data analysis for data presented in the tables.

Therefore, according to at least one possible embodiment, the cell document generator 200 can include a component for recognizing and extracting tables from the original document 101. The extracted table can be analyzed by a component for header detection to determine the location and contents of headers within each table. The headers can be recorded in a memory or cache to preserve the information regarding the headers with reference to the table. Using the headers and the corresponding table, each cell in the table can be analyzed with reference to the headers. Thus, a component for cell extraction can analyze each cell, determine the cell's relationship to the headers of the respective table, and record the relationship to the headers as well as the contents of the cell in a cell document corresponding to the cell. The cell document can, thus, provide information for each cell, including, e.g., row headers, column headers, cell data, table headers, caption, surrounding text, and any other information portrayed in a table. As a result, the cell document includes meta-data created to be associated with a corresponding cell such that pertinent information is regarding the context of the contents of the cell.

Each cell document can then be provided to a cell document interpreter 300. According to aspects of the present invention, the cell document interpreter 300 can provide for generalizability of the contents of the cell documents, and thus the information contained within each cell of each table. For example, the cell document interpreter 300 recognizes the domain of the table. In other words, the cell document interpreter 300 can identify the subject of the information of each table, e.g., biology, physics, mathematics, economics, etc. By recognizing the domain of each table, the cell document interpreter 300 can be trained to perform natural language processing that is optimized for the domain. Because some domains may utilize certain words or the words may have specific meanings in particular domains, the natural language processing can recognize the generalized meanings to correlate the language used in the tables to natural language used, for example, in a search query.

The computer 100 can then communicate the cell documents and the natural language processing results to a transmitter 150 for communication to other devices. For example, the computer 100 can provide the cell documents to a database 120 or cloud service 110 via the transmitter 150 for storage and compilation with other data. Similarly, the cell documents and natural language processing results can be communicated to an intranet or other network 130, as well as personal computers 140.

While the cell document interpreter 300 is described as part of the computer 100 with the cell document generator 200, the cell document interpreter 300 can be included elsewhere, separate from the cell document generator 200. For example, according to aspects of the present invention, the cell document generator 200 can generate cell documents from the original document 101 at the computer 100. The cell documents can be communicated, via transmitter 150, to the database 120. The database 120 can include the cell document interpreter 300 such that, upon a natural language search of the database 120 performed at the computer 100 or the personal computer 140, the cell document interpreter 300 interprets the cell documents in the database for the domain of the corresponding tables, and analyzes each cell document with reference to the search query from the computer 100 or the personal computer 140. Thus, the cell document interpreter 300 can match appropriate cell documents to the natural language search query by generalizing the contents of the cell documents. As a result, the natural language search can more accurately find appropriate cell documents for the search query. The database 120 can then return the information of the appropriate cells, such as, e.g., the documents containing the tables corresponding to the appropriate cell documents, the headings and contents associated with the appropriate cell documents, or any other suitable presentation of the information of the appropriate cell documents.

Figure 2:
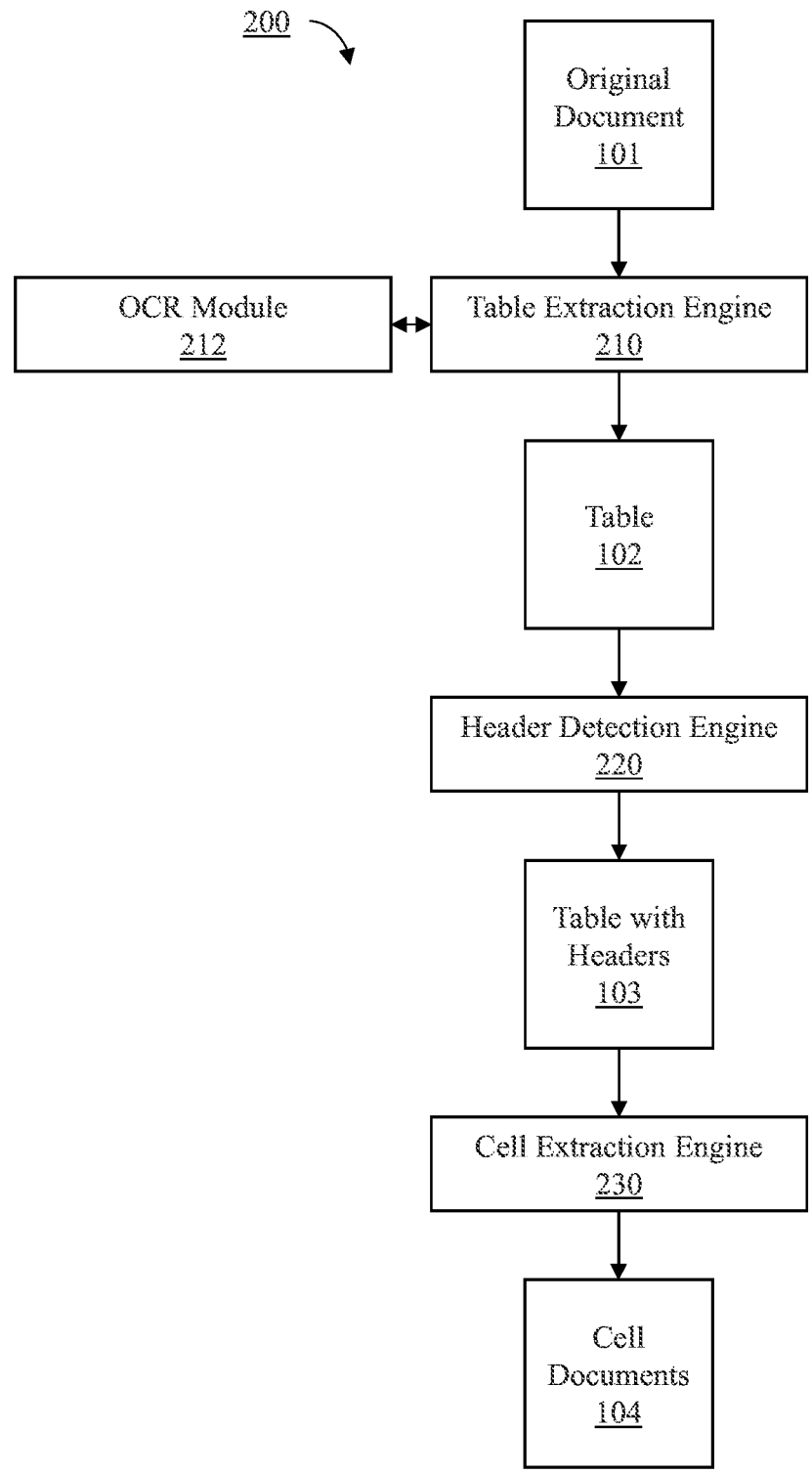
FIG. 2 is a diagram showing a cell document generator that extracts information from tables in a document to produce cell documents, in accordance with an embodiment of the present invention.

Referring now to FIG. 2, a cell document generator 200 that extracts information from tables in a document to produce cell documents is shown in accordance with one embodiment.

According to aspects of the present invention, cell documents 104 can be generated for tables in an original document 101 using cell document generator 200 including, e.g., a table extraction engine 210, header detection engine 220 and cell extraction engine 230.

The original document 101 is provided to the table extraction engine 210 for identification of the tables 102 in the original document 101 and extraction of the tables 102. The original document 101 could be a flat image of a document, such as, e.g., a document scanned to generate an electronic version from a hard copy, and thus does not have formatted text. Accordingly, the original document 101 can be subjected to optical character recognition (OCR) by an OCR module 212 included with the table extraction engine 210. Thus, the original document 101 can be reformatted as a text document in a document format, such as, e.g., HTML or XML among others, rather than an image, and having characters recognizable to a computer program.

Tables in the original document 101 can be extracted by, e.g., identifying lines of a table. The table extraction engine 210 examines each line of text to identify the structure of portions of the original document 101. The table extraction engine 210 can examiner additional features such as, e.g., number of spaces between characters, text features including the characters used, separator features such as punctuation and special characters, among others, with a pattern recognition algorithm such as, e.g., conditional random fields (CRF) model, a hidden Markov model or other Markov model. By applying the pattern recognition algorithm, the table extraction engine 210 can be trained to identify tables as opposed to prose, verse, formulas, pictures, or other text structures. Thus, the table extraction engine 210 identifies the boundaries and the physical structure of tables, including, e.g., rows and columns.

Each table 102 identified by the table extraction engine 210 can be extracted into a memory, such as, e.g., a permanent memory device such as a hard disk drive, solid state drive, or other non-volatile memory device, or into temporary storage such as, e.g., flash memory, random access memory, or other memory including a buffer or a cache. Thus, the tables 102 are copied out of the original document 101 and provided to the header detection engine 220.

Figure 10:
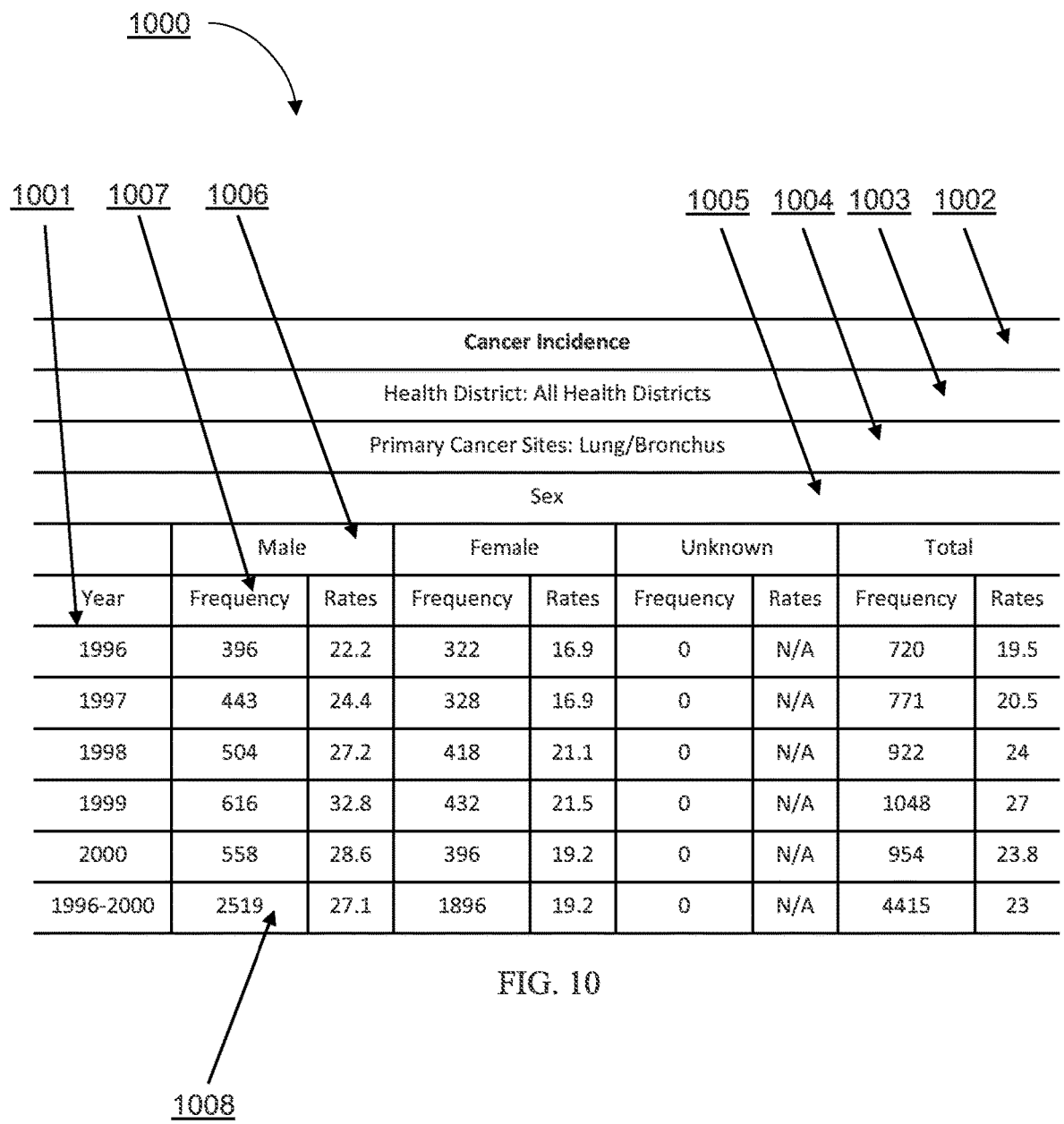
FIG. 10 is a diagram illustrating an example of a table extracted from a document by a table extraction engine of a cell document generator.

An example of a table 1000 recognizable by the table extraction engine is depicted in FIG. 10 according to an embodiment of the present invention. The table 1000 includes four row headers including a title header 1002, a geography header 1003, a diagnosis header 1004, a sex header 1005 and a data header 1007. Additionally, there is a column header represented as a year header 1001. Cells 1008 include data corresponding to the intersection of the year header 1001 and the data header 1007, with context provided by the row headers 1002-1006.

The header detection engine 220 assesses each table 102 along with the structure of the table 102. According to the structure and the characters of the table 102, along with the features described above, such as, e.g., character spacing patterns, the header detection engine 220 can identify which rows and columns are headers as opposed to cells with data. To identify the headers, the header detection engine 220 looks to a combination of features and language of each portion of the table 102. Using a model such as, e.g., one or more classifiers including, e.g., support vector machine (SVM), logistic regression and random forest classification, the header detection engine 220 builds a correlation between divisions of the table 102, such as, e.g., cells, and headers. The correlations can include structural patterns taking spacing into account, as well as words used. For example, the model can recognize that particular words may be more likely to be used in a header, thus informing the correlation between the division and a header of table 102.

Thus, the header detection engine 220 is trained to classify divisions of the table 102 as header or non-header. The non-headers can then be treated as cells at the intersection of row and column headers. The table 102 can then be output from the header detection engine 220 as a table with headers 103 where the headers are annotated with, e.g., a meta-data entry. Accordingly, with reference to FIG. 10, as an example, the header detection engine 220 can examine the table 1000 and identify each header 1001-1007. Thus, information concerning the location and data of each header 1001-1007 can be extracted from table 1000.

The table with headers 103 is provided to the cell extraction engine 230. The cell extraction engine 230 uses the table and headers 103 to generate cell documents 104 with information from the headers corresponding to each cell of the table with headers 103. Thus, the cell extraction engine 230 analyzes the layout and the structure of the table with headers 103, including the headers and locations of each cell according to, e.g., the features described above. Thus, each cell is classified according to the structure of the table with headers 103. Using the structure of the table with headers 103, each cell can be correlated with a row header and with a column header according to the location of the cell. A cell document 104 can then be generated for each cell including information concerning, e.g., the contents of the cell, the row header and the column header, any captions for the table with headers 103 and/or for the cell, surrounding text, table headers, titles, among other information. Thus, a cell document 104 is generated for each cell in each table. The cell document 104 includes contextual information for the corresponding cell, including information identifying the context of the data of the cell as well as the table from to which the cell corresponds.

Figure 3:
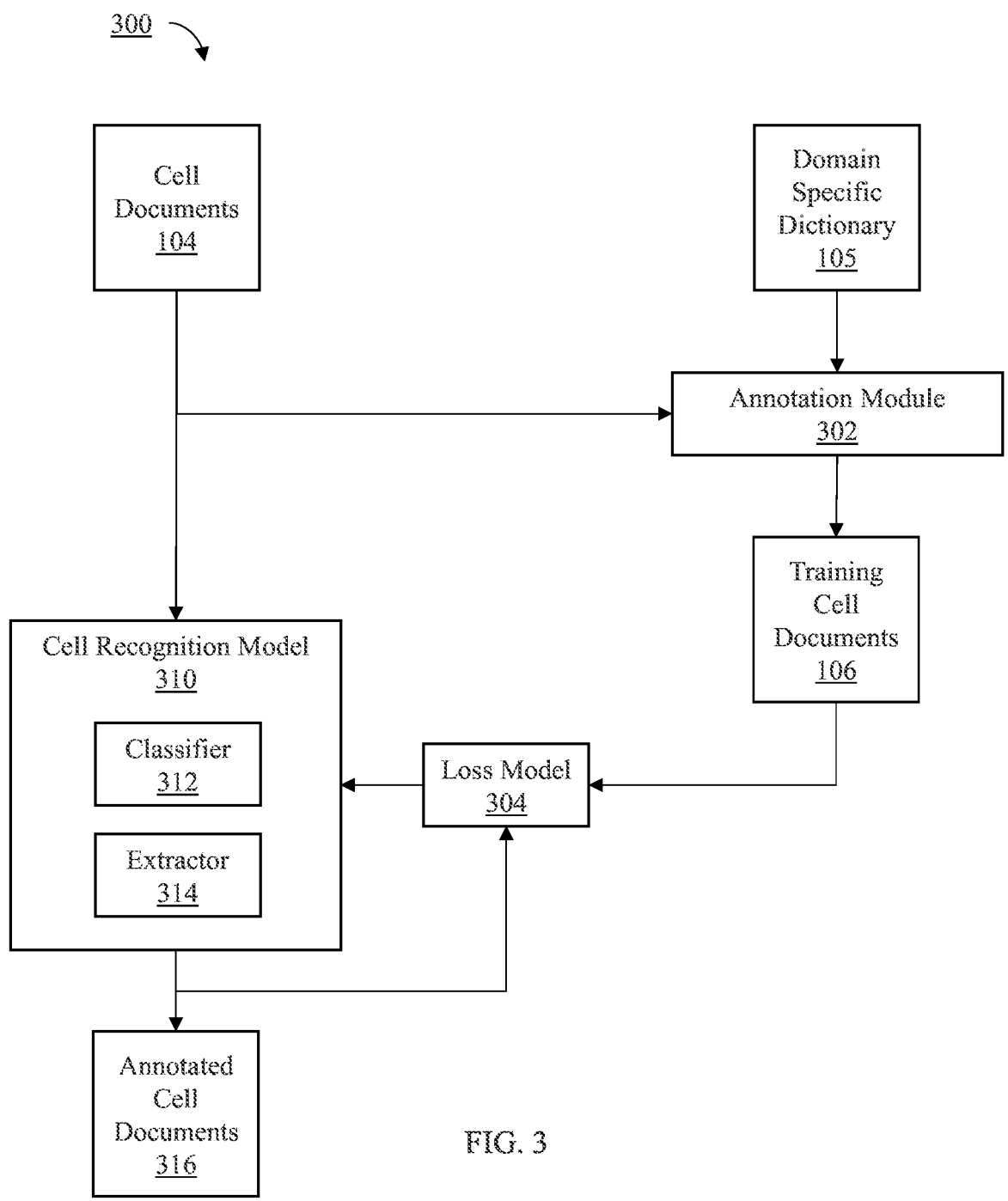
FIG. 3 is a diagram showing a cell document interpreter trained as a cell recognition model for recognizing information in cell documents, in accordance with an embodiment of the present invention.

Referring now to FIG. 3, a cell document interpreter trained as a cell recognition model for recognizing information in cell documents is shown in accordance with one embodiment.

Cell documents 104 generated for a table or set of tables, such as by a system and process described above, can undergo natural language processing. To perform natural language processing, a cell recognition model 310 is trained to recognize the language and relationships used in a table. To train the cell recognition model 310, the cell documents 104 can be annotated with a domain specific dictionary 105.

The domain specific dictionary 105 can be a set of entities or labels concerning, e.g., things, places, concepts, acts, and other terms having meaning within a domain. In this context, a domain can include any area of knowledge. For example, a domain can include, e.g., scientific and mathematic subjects, such as, e.g., medicine, physics, mathematics, statistics, sub-topics of the scientific or mathematic subjects, as well as any other topic of interest, including e.g., sports, entertainment, construction, among others. Thus, the domain specific dictionary 105 can include a set of terms with relations and meanings within a field or subject. For example, the domain specific dictionary 105 can include, e.g., a relationship between "doctorate" and "Ph.D" in the field of education. Thus, the domain specific dictionary 105 can form relationships between terms to identify, e.g., synonyms, relationships, definitions, and other relationships for building context and concepts of the terms used.

Thus, the cell documents 104 can be annotated with the domain specific dictionary 105 using an annotation module 302. By annotating the cell documents 104 with the domain specific dictionary 105, the cell documents 104 are modified to include data for identifying relationships between terms within the cell document to establish, e.g., people, organizations, places, things, relationships (such as, e.g., header concepts), synonyms and concepts, among others. Thus, the relationships of the terms used in the cell documents 104 are inserted into the documents to disambiguate and generalize the terms.

The annotation module 302 can include an automatic mechanism for annotating cell documents 104, such as, e.g., a generative adversarial network (GAN), or a Hypertext Annotation and Trail System (HATS), or other suitable network. Thus, a set of training cell documents 106 are generated from the cell document 104 and the domain specific dictionary 105. The training cell documents 106 can be used as a training documents because the training cell documents 106 have been annotated by techniques known to produce accurate ground-truth annotations to the cell documents 104.

As a result, the cell recognition model 310 can be trained against the training cell documents 106. To do so, the cell recognition model 310 analyzes the cell document 104. The analysis produces a set of annotated cell documents 316 using, e.g., a machine learning model structured for natural language processing. As such, the cell recognition model 310 can be a model that classifies terms and statistically captures relationships amongst identified terms or entities. For example, a statistical model utilizing, e.g., Markov models such as, e.g., maximum-entropy Markov models, hidden Markov models, maximum entropy models, or other statistical or stochastic models and graphical models.

According to aspects of at least one embodiment, the cell recognition model 310 includes an Unstructured Information Management Architecture (UIMA) to form a Statistical Information and Relation Extraction (SIRE) model. The SIRE model includes a classifier that recognizes terms. The classifier 312 can include, e.g., a maximum entropy classifier. Thus, the classifier 312 analyzes the contents of the cell documents 104, including the cell contents and the headers, to recognize and classify words according to learned classifier parameters. An extractor 314 extracts relationships between the classified words of the cell documents 104 according to learned extractor parameters implemented with, e.g., the SIRE model. Thus, the cell recognition model 310 can establish statistical relationships between words classified in the cell documents 104 to recognize context and concepts.

By extracting relationships amongst recognized words in the cell documents 104, the cell recognition model 310 can annotate the cell documents 104 with the corresponding relationships. The relationships can include, e.g., case restoration, parsing, semantic role labeling, time normalization of temporal expressions, an index of synonyms, and other linguistic features for capturing concepts rather than verbatim terms and phrases.

To improve the generation of annotated cell documents 316, the cell recognition model 310 can be trained using the training cell documents 106. The annotated cell documents 316 and the training cell documents 106 can be provided to a loss model 304. The loss model 304 can compare the annotated cell documents 316 to the ground-truth training cell documents 106 to determine an error of the annotations in the annotated cell documents 316. The loss model 304 can include, e.g., maximum entropy loss, cross entropy loss, or other loss determination technique. Thus, the loss model 304 generates an error that can be backpropagated to the cell recognition model 310 to update the classifier parameters and extractor parameters according to, e.g., gradient descent, or other backpropagation technique.

Because the training cell documents 106 have been annotated with the domain specific dictionary 105, the cell recognition model 310 is trained against a particular domain corresponding to the cell documents 104. Thus, the cell recognition model 310 is trained to recognize and annotate the content of each cell document 104 in the context of a domain corresponding to the cell documents 104. Thus, the cell recognition model 310 can perform precise and accurate annotation without access to any dictionaries at all. Thus, the cell recognition model 310 can more efficiently perform natural language processing on the cell documents 104 by removing the need to reference domain specific dictionaries 105 that require increased processing and storage resources. As a result, the natural language processing performed by, e.g., a processor implementing the cell recognition model 310 and stored, e.g., in a memory device, is more processing and memory efficient, leading to faster, more accurate annotation of cell documents.

While the cell recognition model 310 is described above as being trained against a specific domain, the cell recognition model 310 can be trained to annotate in the context of any breadth of domains, including, e.g., general language. However, the more general the domain, the more general the annotations, thus resulting a trade-off between the types of concepts being recognized and the precision with which the annotations can be performed. For example, greater insight into a narrow domain can be provided by training against a specific domain such as, e.g., oncology. However, training against, e.g., medicine, which may be more general than oncology, can recognize more relationships across more terms, but with less insight. Thus, the balance between precision and breadth of the annotations can be customized as desired by training against a domain of desired specificity.

Figure 4:
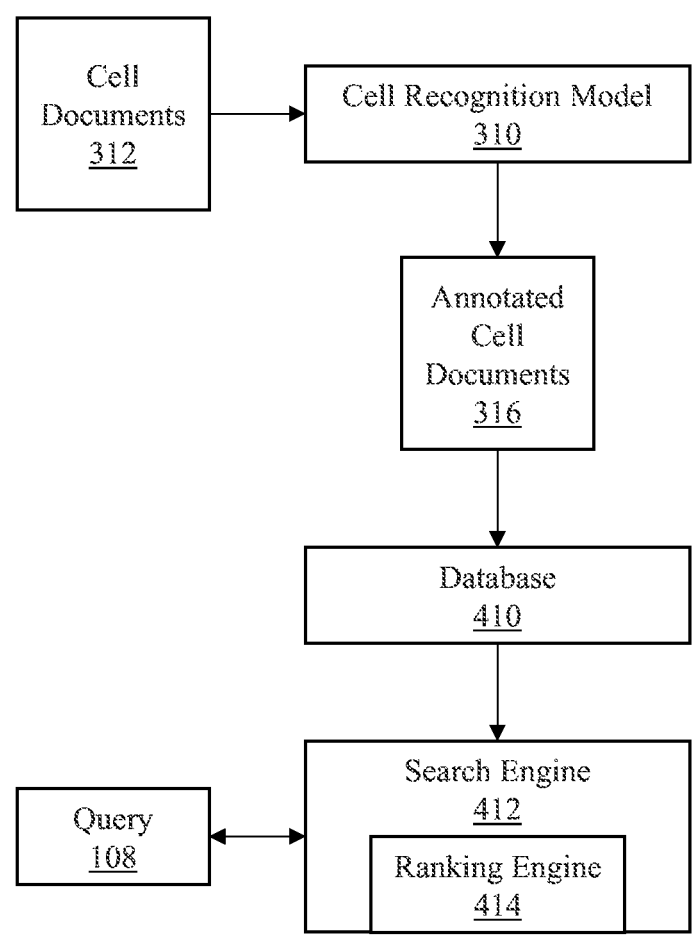
FIG. 4 is a diagram showing a system for querying a table according to annotated cell documents produced by the cell recognition model from cell documents, in accordance with an embodiment of the present invention.

Referring now to FIG. 4, a system for querying a table according to annotated cell documents produced by the cell recognition model from cell documents is shown in accordance with one embodiment.

A cell recognition model 310, such as, e.g., the cell recognition model 310 described above, can analyze cell documents 312 to generate annotated cell documents 316 for natural language search queries. Thus, the cell documents 312 are provided to the cell recognition model 310, which classifies terms in the cell documents and extracts relationships amongst the terms according to, e.g., a learned statistical model for a domain. Thus, annotations can be added to each cell document 312 in an accurate and efficient manner, as described above.

The annotated cell documents 316 include the original terms present in the cell and associated headers, along with annotations concerning relationships and linguistic features for disambiguating the exact terms. Thus, the annotated cell documents 316 include information regarding the context within the domain of the tables from which the cells corresponding to the cell documents 312 originate. The annotated cell documents 316 can be stored in database 410 for storage and retrieval.

The annotated cell documents 316 can be efficiently retrieved from the database by leveraging the annotations and associated concepts. According to aspects of at least one embodiment of the present invention, the database 410 is searched using an information retrieval system, such as, e.g., a search engine 412. A query 108 is entered into the search engine 412. The query 108 can be a natural language search query. The search engine 412 parses the query 108 to determine a search strategy according to items and relations within the query 108. Thus, the search engine 412 can perform natural language processing on the query 412 to structure search criteria without the need for explicit operations, such as, e.g., Boolean operations.

The search engine 412 searches each item in the database 410 including all annotated cell documents 316 stored therein to determine matches between the concepts being searched by the query 108 and the concepts present in each annotated cell document 316 according to the annotations. The matching can include matching similar concepts as identified based on synonyms of terms and relationships between terms. The search engine 412 can return one or more matches to a user via, e.g., a display or other interface.

Because the annotated cell documents 316 are matched to the query 108 according to concepts rather than precise words, there can be a range of confidence in the relevance of various annotated cell documents 316. As a result, the search engine 412 can include a ranking engine 414 to return a ranked list of matched annotated cell documents 316 to a user. The matches can be ranked according to, e.g., confidence of identification of entities classified by the model, or a quality of the match between the query 108 and annotated cell document 312.

According to aspects of at least one embodiment of the present invention, the ranking engine 414 ranks annotated cell documents 316 by, e.g., summing weight scores of relevance to the query 108. For example, weights can be determined for different parts of the table, such as, e.g., table captions may have lower weight because it is more common and less identifiable while more identifiable or unique fields to a particular cell may be ranked higher. The relevance of each item in the annotated cell documents 316 are scored according to the weights, and the overall relevance of an annotated cell document 316 can be determined according to a sum of the scored items. The ranking engine 414 can, therefore, include, e.g., a machine learning mechanism. As such, a ranking network is implemented by training the weights associated with each item of the annotated cell documents 316. For example, training data can be provided that includes queries and expected results, such as, e.g., a ranked list of annotated cell documents 316.

Accordingly, the search engine 412 can leverage the annotations of generated by the cell recognition model 310 to better, more efficiently match a natural language query 108 to one or more annotated cell documents 316.

Figure 5:
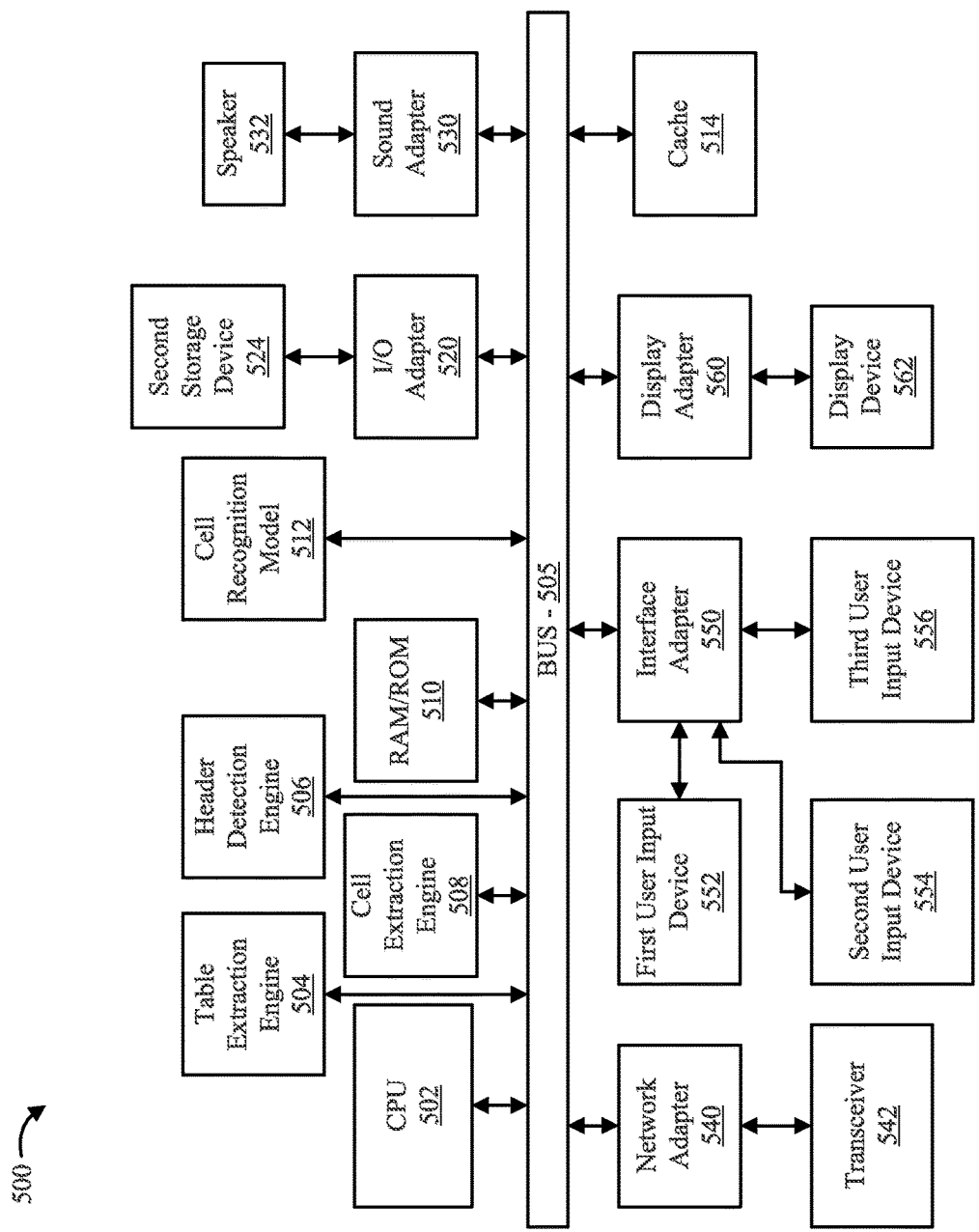
FIG. 5 is a diagram showing an exemplary processing system for extraction information from open-ended schemaless tables, in accordance with an embodiment of the present invention.

Referring now to FIG. 5, an exemplary processing system 500 for extraction information from open-ended schemaless tables is shown in accordance with one embodiment. The processing system 500 includes at least one processor (CPU) 504 operatively coupled to other components via a system bus 502. A cache 514, a Read Only Memory (ROM) and/or a Random Access Memory (RAM) 510, an input/output (I/O) adapter 520, a sound adapter 530, a network adapter 540, a user interface adapter 550, and a display adapter 560, are operatively coupled to the system bus 502.

A first storage device 522 and a second storage device 524 are operatively coupled to system bus 502 by the I/O adapter 520. The storage devices 522 and 524 can be any of a disk storage device (e.g., a magnetic or optical disk storage device), a solid state magnetic device, and so forth. The storage devices 522 and 524 can be the same type of storage device or different types of storage devices.

The processing system 500 can include a table extraction engine 504 in communication with the system bus 502. The table extraction engine 504 is stored in a memory device, such as, e.g., ROM/RAM 510 or cache 514, or a separate memory device. The table extraction engine 504 can be implement by a processor, such as, e.g., CPU 504 or a separate processor.

A header detection engine 506 is connected to the system bus 502 to detect and extract headers present within tables extracted by the table extraction engine 504. Thus, the tables can be stored in a storage or memory device, e.g., RAM/ROM 510, cache 514, or the first or second storage devices 522 and 524 for access by the header detection engine 506. The header detection engine 506 can extract the headers and store the headers with associated tables in one of the memory or storage devices discussed above.

A cell extraction engine 508, in communication with the system bus 504, can access the tables and headers via the system bus 504. The cell extraction engine 508 can identify and extract cells from the tables, and generate cell documents corresponding to each cell. The cell documents can be stored within one of the memory or storage device via the system bus 504.

A cell recognition model 512, in communication with the system bus 504, access the cell documents to analyze each cell document and generate annotations as described above. The annotations can be inserted into the cell documents to provide information regarding linguistic features in the cell documents to capture concepts with natural language processing. The annotated cell documents can then be stored in the first storage device 522 or the second storage device 524, or can be sent to a separate cloud service or database via the network adapter 540 and transceiver 542. Thus, the processing system 500 is configured to extract tables and headers from documents, such as, e.g., HTML documents, as described above, and generate annotated cell documents with natural language processing.

A speaker 532 is operatively coupled to system bus 502 by the sound adapter 530. A transceiver 542 is operatively coupled to system bus 502 by network adapter 540. A display device 562 is operatively coupled to system bus 502 by display adapter 560.

A first user input device 552, a second user input device 554, and a third user input device 556 are operatively coupled to system bus 502 by user interface adapter 550. The user input devices 552, 554, and 556 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 552, 554, and 556 can be the same type of user input device or different types of user input devices. The user input devices 552, 554, and 556 are used to input and output information to and from system 500.

Of course, the processing system 500 may also include other elements (not shown), as readily contemplated by one of skill in the art, as well as omit certain elements. For example, various other input devices and/or output devices can be included in processing system 500, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 500 are readily contemplated by one of ordinary skill in the art given the teachings of the present invention provided herein.

Figure 6:
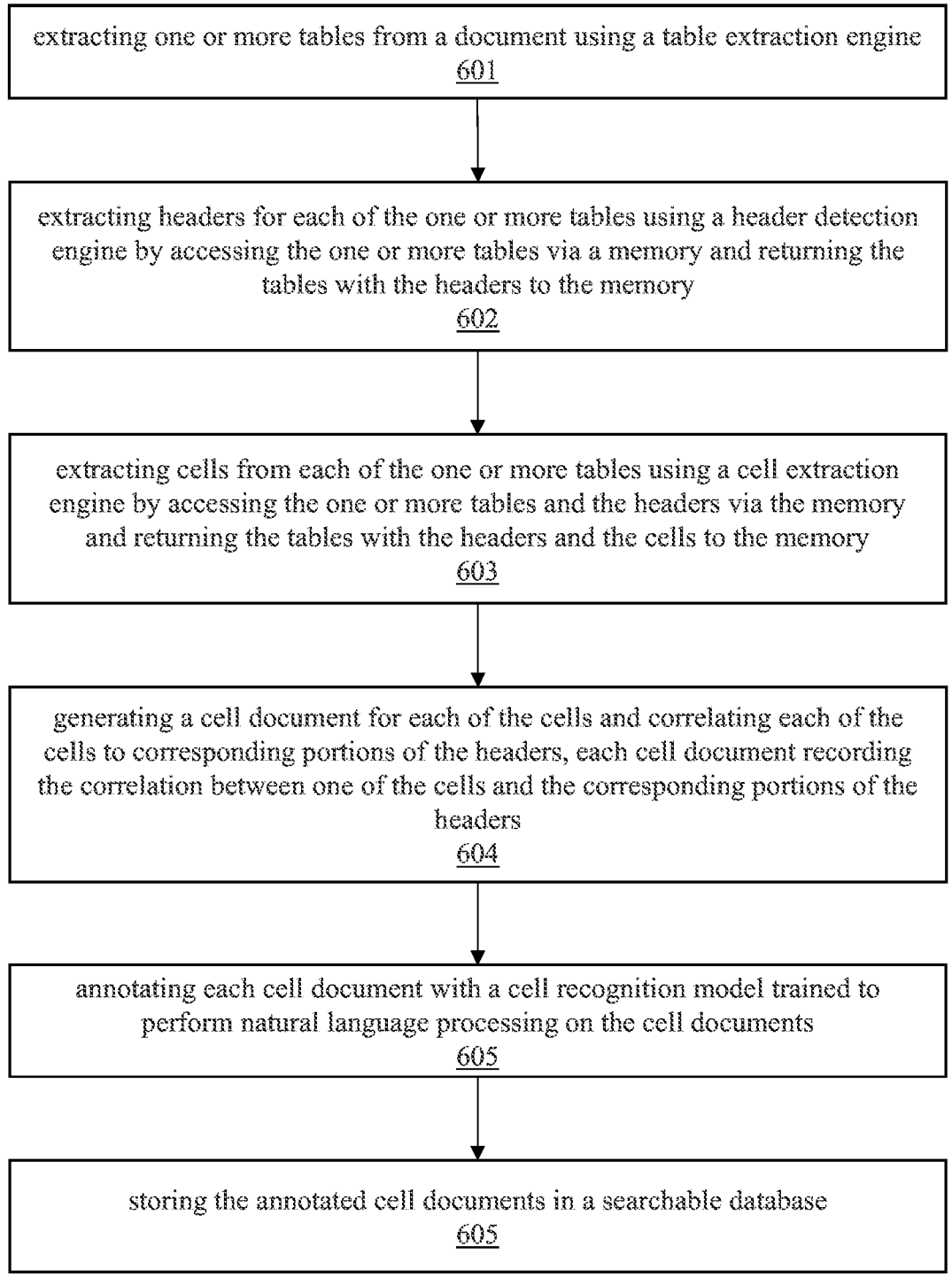
FIG. 6 is a block/flow diagram showing a system/method for extracting information from document tables, in accordance with an embodiment of the present invention.

Referring now to FIG. 6, a system/method for extracting information from document tables is shown in accordance with one embodiment.

At block 601, one or more tables are extracted from a document using a table extraction engine. The table extraction engine can include any device or technique for identifying tables within a virtual document. The virtual document can be any one or multiple of, e.g., a word processor document, an editable or non-editable document such as, e.g., a PDF, a hyper-text document, or a scanned image of a physical document.

At block 602, headers for each of the one or more tables are extracted using a header detection engine by accessing the one or more tables via a memory and returning the tables with the headers to the memory. The header detection engine can include any hardware or software suitable for detecting one or more headers in a table. The table can be either open-ended or closed, and either schema-less or including a schema.

The header detection engine can be a distinct processing system, including, e.g., a processor for executing the header detection engine, and a storage and/or memory for storing a header detection program. Alternatively, the header detection engine can be a program saved in a memory or storage of a shared computing device, such as, e.g., a person computer, server, virtual computer or server, or other device having resources shared amongst other functions.

At block 603, cells from each of the one or more tables are extracted using a cell extraction engine by accessing the one or more tables and the headers via the memory and returning the tables with the headers and the cells to the memory. The cell detection engine can include any hardware or software suitable for detecting one or more cells in a table. The table can be either open-ended or closed, and either schema-less or including a schema.

The cell extraction engine can be a distinct processing system, including, e.g., a processor for executing the header detection engine, and a storage and/or memory for storing a cell extraction program. Alternatively, the cell extraction engine can be a program saved in a memory or storage of a shared computing device, such as, e.g., a person computer, server, virtual computer or server, or other device having resources shared amongst other functions.

At block 604, a cell document is generated for each of the cells and correlating each of the cells to corresponding portions of the headers, each cell document recording the correlation between one of the cells and the corresponding portions of the headers. The cell document is a virtual document, such as, e.g., a plain text document, hyper-text document, or other document that can include and represent the cell contents as well as the appropriate headers.

At block 605, each cell document is annotated with a cell recognition model trained to perform natural language processing on the cell documents. The annotations can include any information useful for representing the information captured by a cell of the table. For example, the annotations can include, e.g., linguistic information for relaying context and subject matter, however the annotations can also include information related to any other desired feature of the contents of the table.

The cell recognition model can be a distinct processing system, including, e.g., a processor for executing the cell recognition model, and a storage and/or memory for storing a cell recognition program. Alternatively, the cell recognition model can be a program saved in a memory or storage of a shared computing device, such as, e.g., a person computer, server, virtual computer or server, or other device having resources shared amongst other functions.

At block 606, the annotated cell documents are stored in a searchable database.

Storing the annotated cell documents in a searchable database facilitates searching the cell documents. As a result, a document that includes information contained in tables can be made searchable with the annotated cell documents because each cell of the tables in the document include relational and linguistic information. As a result, a remote computer can communicate with the database and enter a natural language search query. The database can match the natural language query to linguistic information included in the annotated cell documents. Cell documents with a high degree of probability of being a match for the natural language query can, therefore, be returned to the searcher at the remote computer. Thus, the most relevant information, such as numerical data, is returned to the searcher using a simple natural language query. Therefore, the information included in the document is made more accessible and easier to search, facilitating the database returning information to a searcher that would otherwise not be findable with difficult search techniques.

Figure 7:
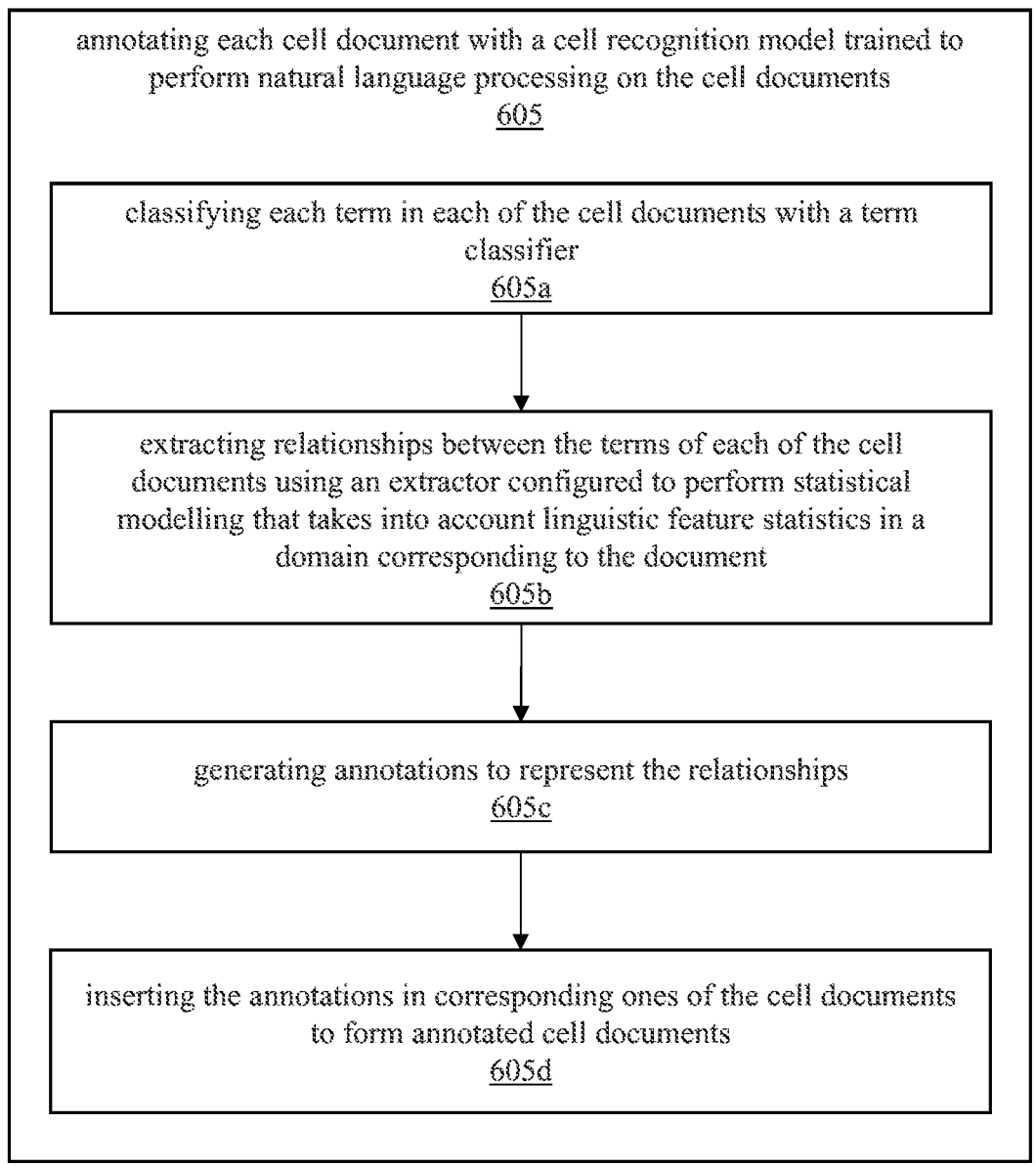
FIG. 7 is a block/flow diagram showing a system/method for annotating cell documents, in accordance with an embodiment of the present invention.

Referring now to FIG. 7, a system/method for annotating cell documents is shown in accordance with one embodiment.

At block 605*a*, annotating the cell documents includes classifying each term in each of the cell documents with a term classifier.

The term classifier can be a distinct processing system, including, e.g., a processor for executing the term classifier, and a storage and/or memory for storing a term classifier program. Alternatively, the term classifier can be a program saved in a memory or storage of a shared computing device, such as, e.g., a person computer, server, virtual computer or server, or other device having resources shared amongst other functions.

At block 605*b*, relationships between the terms of each of the cell documents are extracted using an extractor configured to perform statistical modelling that takes into account linguistic feature statistics in a domain corresponding to the document.

The extractor can be a distinct processing system, including, e.g., a processor for executing the extractor, and a storage and/or memory for storing a extraction program. Alternatively, the extractor 1 can be a program saved in a memory or storage of a shared computing device, such as, e.g., a person computer, server, virtual computer or server, or other device having resources shared amongst other functions.

At block 605*c*, annotations to represent the relationships are generated.

At block 605*d*, the annotations are inserted in corresponding ones of the cell documents to form annotated cell documents.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
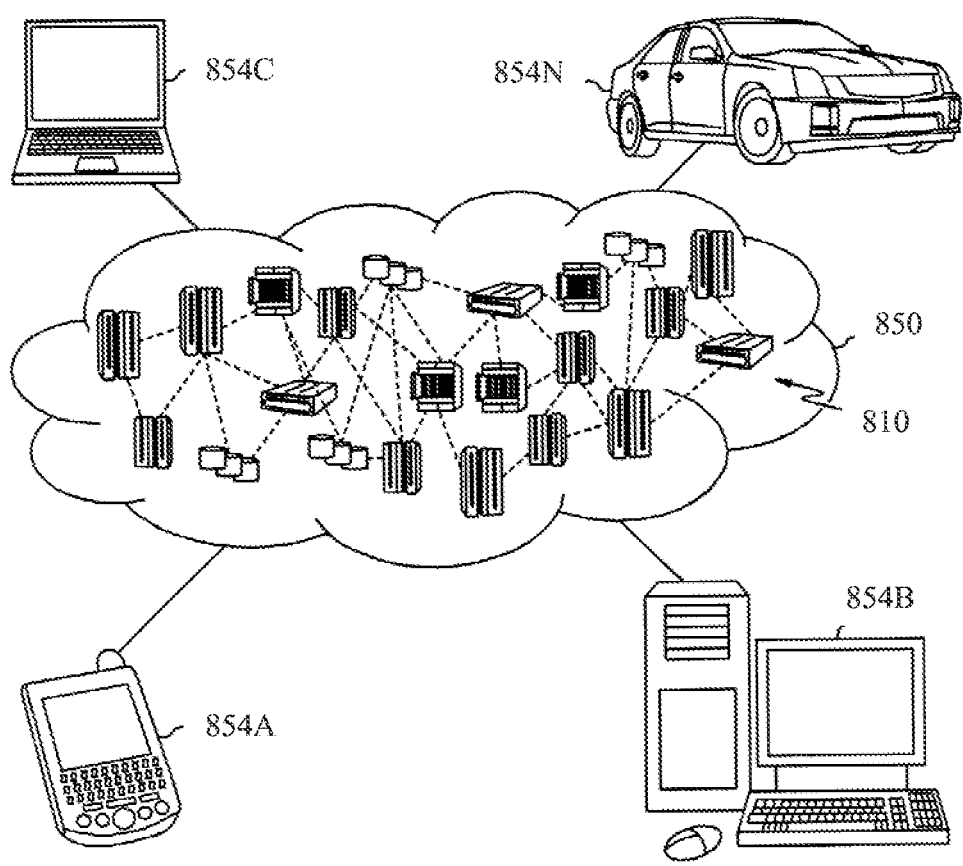
FIG. 8 is a block diagram showing an illustrative cloud computing environment having one or more cloud computing nodes with which local computing devices used by cloud consumers communicate in accordance with one embodiment.

Referring now to FIG. 8, illustrative cloud computing environment 850 is depicted. As shown, cloud computing environment 850 includes one or more cloud computing nodes 810 with which local computing devices used by cloud consumers, such as, for example, personal digital assistant (PDA) or cellular telephone 854A, desktop computer 854B, laptop computer 854C, and/or automobile computer system 854N may communicate. Nodes 810 may communicate with one another. They may be grouped (not shown) physically or virtually, in one or more networks, such as Private, Community, Public, or Hybrid clouds as described hereinabove, or a combination thereof. This allows cloud computing environment 850 to offer infrastructure, platforms and/or software as services for which a cloud consumer does not need to maintain resources on a local computing device. It is understood that the types of computing devices 854A-N shown in FIG. 8 are intended to be illustrative only and that computing nodes 810 and cloud computing environment 850 can communicate with any type of computerized device over any type of network and/or network addressable connection (e.g., using a web browser).

Figure 9:
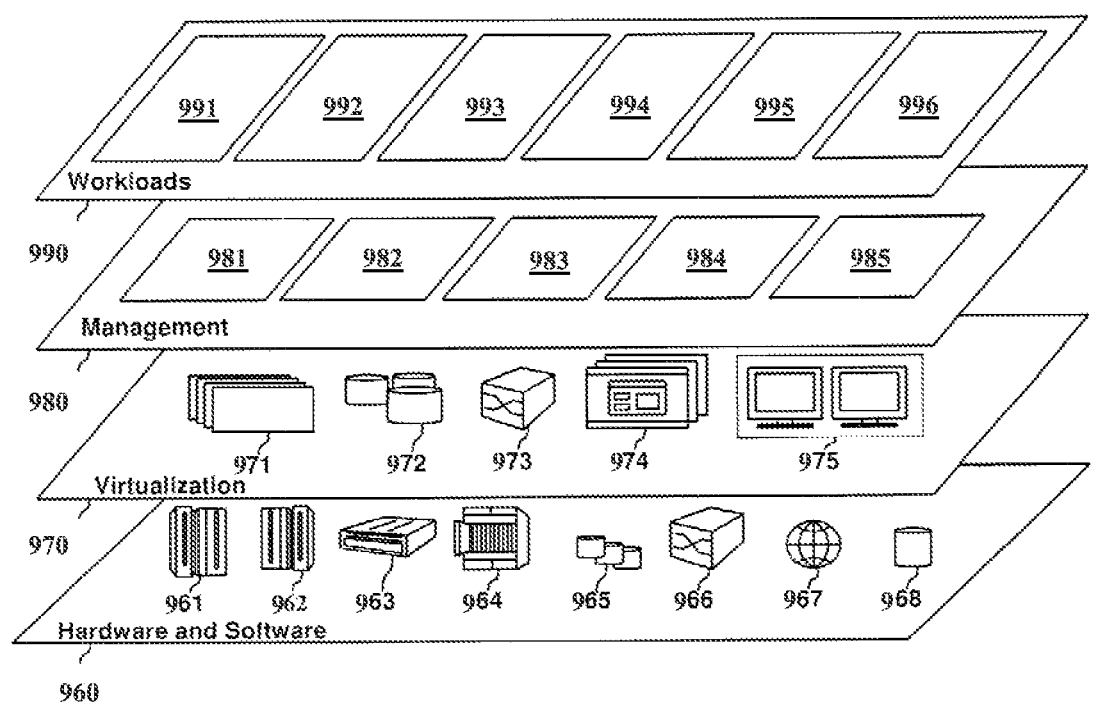
FIG. 9 is a block diagram showing a set of functional abstraction layers provided by a cloud computing environment in accordance with one embodiment.

Referring now to FIG. 9, a set of functional abstraction layers provided by cloud computing environment 850 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 960 includes hardware and software components. Examples of hardware components include: mainframes 961; RISC (Reduced Instruction Set Computer) architecture based servers 962; servers 963; blade servers 964; storage devices 965; and networks and networking components 966. In some embodiments, software components include network application server software 967 and database software 968.

Virtualization layer 970 provides an abstraction layer from which the following examples of virtual entities may be provided: virtual servers 971; virtual storage 972; virtual networks 973, including virtual private networks; virtual applications and operating systems 974; and virtual clients 975.

In one example, management layer 980 may provide the functions described below. Resource provisioning 981 provides dynamic procurement of computing resources and other resources that are utilized to perform tasks within the cloud computing environment. Metering and Pricing 982 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 983 provides access to the cloud computing environment for consumers and system administrators. Service level management 984 provides cloud computing resource allocation and management such that required service levels are met. Service Level Agreement (SLA) planning and fulfillment 985 provide pre-arrangement for, and procurement of, cloud computing resources for which a future requirement is anticipated in accordance with an SLA.

Workloads layer 990 provides examples of functionality for which the cloud computing environment may be utilized. Examples of workloads and functions which may be provided from this layer include: mapping and navigation 991; software development and lifecycle management 992; virtual classroom education delivery 993; data analytics processing 994; transaction processing 995; and information extraction from open-ended schema-less tables 996.

Referring now to FIG. 10, an illustration of a table having headers and cells is depicted in accordance with an embodiment of the present invention.

According to aspects of the present invention, an example of a table 1000 recognizable by the table extraction engine can include headers 1001-1007. For example, the table 1000 can include four row headers including a title header 1002, a geography header 1003, a diagnosis header 1004, a sex header 1005 and a data header 1007. Additionally, there is a column header represented as a year header 1001. Cells 1008 include data corresponding to the intersection of the year header 1001 and the data header 1007, with context provided by the row headers 1002-1006.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method for information extraction from open-ended schema-less tables (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A computer implemented method for annotating data entry cells, the method comprising:
    extracting headers for one or more tables;
    extracting cells from each of the one or more tables by accessing the one or more tables and the headers and storing the tables with the headers and the cells in memory;
    generating a cell document for each of the cells and correlating each of the cells to corresponding portions of the headers, each cell document recording the correlation between one of the cells and the corresponding portions of the headers; and annotating each cell document to generate annotated cell documents with natural language processing by classifying each term in each of the cell document and extracting relationships between the terms of each of the cell document; and ranking the one or more of the annotated cell documents by determining a relevance of terms according to a weight corresponding to a part of the one or more tables to which each of the terms corresponds.

2. The computer implemented method of claim 1, further comprising storing the annotated cell documents in a searchable database.

3. The computer implemented method as recited in claim 1, further comprising extracting relationships between the terms of each of the cell documents includes an extractor including a hardware processor that is configured to perform statistical modelling that takes into account linguistic feature statistics in a domain corresponding to a document including the one or more tables.

4. The computer implemented method as recited in claim 1 further comprising recognizing characters in the document by performing optical character recognition.

5. The computer implemented method as recited in claim 1, further comprising matching one or more of the annotated cell documents to a natural language search query entered into the searchable database.

6. The computer implemented method as recited in claim 4, further comprising searching the database with a search engine by matching a natural language search query with one or more of the annotated cell documents according to a similarity between concepts of the natural language search query and concepts of each of the one or more of the annotated cell documents.

7. The computer implemented method as recited in claim 1, further comprising training a cell recognition model including:
generating annotated training cell documents; and
determining an error between the annotated training cell documents and the annotated cell documents.

8. The computer implemented method as recited in claim 7, wherein training the cell recognition model further includes training the cell recognition model according to a domain by generating the annotated training cell documents with a domain specific dictionary of terms and linguistic features.

9. The computer implemented method as recited in claim 8, wherein the domain specific dictionary includes an index of synonyms.

10. A computer program product for annotating data entry cells comprising a computer readable storage medium having computer readable program code embodied therewith, the program instructions executable by a processor to cause the processor to:
extract, using the processor, one or more tables of data from a document;

extract, using the processor, headers for each of the one or more tables by accessing the one or more tables via a memory and returning the tables with the headers to the memory;

extract, using the processor, cells from each of the one or more tables by accessing the one or more tables and the headers via the memory and returning the tables with the headers and the cells to the memory;

generate, using the processor, a cell document for each of the cells and correlating each of the cells to corresponding portions of the headers, each cell document recording the correlation between one of the cells and the corresponding portions of the headers; and annotate, using the processor, each cell document to generate annotated cell documents with natural language processing on the cell documents by classifying each term in each of the cell documents and extracting relationships between the terms of each of the cell documents.

11. The computer program product of claim 10, wherein the program instructions executable by the processor further comprise to store the annotated cell documents in a searchable database.

12. The computer program product of claim 10, further comprising storing the annotated cell documents in a searchable database.

13. The computer program product of claim 10, further comprising extracting relationships between the terms of each of the cell documents includes an extractor including a hardware processor that is configured to perform statistical modelling that takes into account linguistic feature statistics in a domain corresponding to a document including the one or more tables.

14. The computer program product of claim 10 further comprising recognizing characters in the document by performing optical character recognition.

15. The computer program product of claim 12, further comprising matching one or more of the annotated cell documents to a natural language search query entered into the searchable database.

16. The computer program product of claim 15, further comprising searching the database with a search engine by matching a natural language search query with one or more of the annotated cell documents according to a similarity between concepts of the natural language search query and concepts of each of the one or more of the annotated cell documents.

17. The computer program product of claim 10, further comprising training a cell recognition model including:
generating annotated training cell documents; and
determining an error between the annotated training cell documents and the annotated cell documents.

18. The computer program product of claim 17, wherein training the cell recognition model further includes training the cell recognition model according to a domain by generating the annotated training cell documents with a domain specific dictionary of terms and linguistic features.

* * * * *